(12) United States Patent
Duffy et al.

(10) Patent No.: US 10,408,187 B2
(45) Date of Patent: Sep. 10, 2019

(54) WAVE ENERGY CONVERTOR

(71) Applicant: JOSPA LIMITED, Blackrock, County Dublin (IE)

(72) Inventors: Patrick Joseph Duffy, Blackrock (IE); Jocelyn Raymond Fitzsimons, Cork (IE)

(73) Assignee: JOSPA LIMITED, Blackrock, County Dublin (IE)

( * ) Notice: Subject to any disclaimer, the term of this patent is extended or adjusted under 35 U.S.C. 154(b) by 0 days.

(21) Appl. No.: 15/751,505

(22) PCT Filed: Aug. 9, 2016

(86) PCT No.: PCT/EP2016/068990
§ 371 (c)(1),
(2) Date: Feb. 9, 2018

(87) PCT Pub. No.: WO2017/025544
PCT Pub. Date: Feb. 16, 2017

(65) Prior Publication Data
US 2018/0238295 A1 Aug. 23, 2018

(30) Foreign Application Priority Data
Aug. 12, 2015 (EP) .................................. 15180722

(51) Int. Cl.
*F03B 13/18* (2006.01)
*F03B 13/22* (2006.01)
*F03B 13/20* (2006.01)

(52) U.S. Cl.
CPC ........ *F03B 13/1815* (2013.01); *F03B 13/181* (2013.01); *F03B 13/20* (2013.01);
(Continued)

(58) Field of Classification Search
USPC .................. 290/53; 60/490–509; 416/79, 80
See application file for complete search history.

(56) References Cited

U.S. PATENT DOCUMENTS

| 735,510 A | * | 8/1903 | Hergenhan et al. .. F03B 13/187 60/501 |
| 1,018,678 A | * | 2/1912 | Nelson .................... F02B 63/04 290/4 D |

(Continued)

FOREIGN PATENT DOCUMENTS

| ES | 2 354 097 A1 | 3/2011 |
| FR | 2 996 264 | 4/2014 |

(Continued)

OTHER PUBLICATIONS

International Search Report issued in PCT/EP2016/068990; dated Jan. 12, 2017.

(Continued)

*Primary Examiner* — Pedro J Cuevas
(74) *Attorney, Agent, or Firm* — Studebaker & Brackett PC

(57) ABSTRACT

A wave energy converter has blades (54, 56, 57, 59) on frames (51, 52) rotating about a pivot joint (53) on a structure (4, 52, 502, 505, 86). There is reciprocating rotary motion of the frame with respect to the structure, providing reciprocating rotary input power to a mechanism (73, 94, 98). The mechanism (98) may be arranged so that the reciprocating input power is transferred to uni-directional power via pulleys (101, 106) and sprag clutches (102, 107).

11 Claims, 12 Drawing Sheets

(52) U.S. Cl.
CPC .......... *F03B 13/22* (2013.01); *F05B 2240/97* (2013.01); *F05B 2260/406* (2013.01); *Y02E 10/38* (2013.01)

(56) References Cited

U.S. PATENT DOCUMENTS

| | | | | |
|---|---|---|---|---|
| 1,033,476 A * | 7/1912 | Schulze | F03B 13/187 | 440/9 |
| 1,471,222 A * | 10/1923 | Taylor | F03B 13/186 | 60/496 |
| 1,601,246 A * | 9/1926 | Frost | B63H 1/36 | 416/82 |
| 1,867,780 A * | 7/1932 | Tidwell | F03B 13/1815 | 60/500 |
| 1,953,285 A * | 4/1934 | Arner | F03B 13/1815 | 60/498 |
| 2,179,537 A * | 11/1939 | Zoppa | F03B 13/185 | 204/230.5 |
| 2,749,871 A * | 6/1956 | Scherer | B63B 1/286 | 114/276 |
| 3,532,067 A * | 10/1970 | Baker | B63B 1/28 | 114/279 |
| 3,965,365 A * | 6/1976 | Parr | F03B 13/1815 | 290/53 |
| 4,092,828 A * | 6/1978 | Garza | F03B 13/1815 | 417/332 |
| 4,145,885 A * | 3/1979 | Solell | F03B 13/1855 | 290/53 |
| 4,208,877 A * | 6/1980 | Evans | F03B 13/1885 | 290/53 |
| 4,228,360 A * | 10/1980 | Navarro | F03B 13/1885 | 290/43 |
| 4,249,639 A * | 2/1981 | Vukovic | F03B 13/1815 | 185/30 |
| 4,319,454 A * | 3/1982 | Lucia | F03B 13/1815 | 417/332 |
| 4,347,036 A * | 8/1982 | Arnold | F03D 5/06 | 416/1 |
| 4,355,511 A * | 10/1982 | Jones | F03B 13/1845 | 290/42 |
| 4,389,843 A * | 6/1983 | Lamberti | F03B 13/1815 | 290/42 |
| 4,418,286 A * | 11/1983 | Scott | F03B 13/182 | 290/42 |
| 4,469,955 A * | 9/1984 | Trepl, II | F03B 13/1815 | 290/42 |
| 4,470,770 A * | 9/1984 | Grose | F03D 5/06 | 416/79 |
| 4,486,145 A * | 12/1984 | Eldredge | F03D 5/06 | 416/82 |
| 4,525,122 A * | 6/1985 | Krnac | F03D 5/06 | 416/80 |
| 4,595,336 A * | 6/1986 | Grose | F03D 5/06 | 416/79 |
| 4,598,547 A * | 7/1986 | Danihel | F03B 13/1815 | 440/9 |
| 4,718,231 A * | 1/1988 | Vides | F03B 13/1815 | 60/398 |
| 4,792,290 A * | 12/1988 | Berg | F03B 13/1815 | 417/332 |
| 4,803,839 A * | 2/1989 | Russo, III | F03B 13/1865 | 60/501 |
| 4,828,205 A * | 5/1989 | Durand | B64C 27/10 | 244/17.23 |
| 4,931,662 A * | 6/1990 | Burton | F03B 13/1815 | 290/42 |
| 5,009,571 A * | 4/1991 | Smith | F03D 5/06 | 416/79 |
| 5,066,867 A * | 11/1991 | Shim | F03B 13/1885 | 290/53 |
| 5,193,978 A * | 3/1993 | Gutierrez | F03D 3/067 | 416/119 |
| 5,324,169 A * | 6/1994 | Brown | F03B 17/06 | 416/17 |
| 5,921,082 A * | 7/1999 | Berling | F03B 13/1815 | 290/42 |
| 6,153,944 A * | 11/2000 | Clark | F03B 17/06 | 290/54 |
| 6,273,680 B1 * | 8/2001 | Arnold | F03B 17/00 | 416/1 |
| 6,323,563 B1 * | 11/2001 | Kallenberg, Jr. | F03B 17/067 | 290/42 |
| 6,652,232 B2 * | 11/2003 | Bolduc | F03B 17/06 | 416/24 |
| 6,681,572 B2 * | 1/2004 | Flory | E02B 9/08 | 60/497 |
| 6,726,440 B2 * | 4/2004 | Pollard, V | F03D 5/00 | 415/4.1 |
| 6,814,633 B1 * | 11/2004 | Huang | B63H 19/02 | 440/9 |
| 6,925,800 B2 * | 8/2005 | Hansen | F03B 13/1815 | 60/497 |
| 7,198,223 B2 * | 4/2007 | Phelps, III | B64C 27/10 | 244/17.11 |
| 7,456,512 B2 * | 11/2008 | Nadel | F03B 13/20 | 290/53 |
| 7,459,802 B2 * | 12/2008 | Loui | F03B 13/1815 | 290/42 |
| 7,493,759 B2 * | 2/2009 | Bernitsas | F03B 17/06 | 60/497 |
| 7,632,069 B2 * | 12/2009 | Kelley | F03B 17/06 | 416/80 |
| 7,791,213 B2 * | 9/2010 | Patterson | F03B 13/1865 | 290/53 |
| 7,905,705 B2 * | 3/2011 | Kelley | F03B 17/06 | 416/80 |
| 7,989,973 B2 * | 8/2011 | Birkestrand | E02B 9/00 | 290/44 |
| 7,994,651 B2 * | 8/2011 | Frishberg | F03B 13/1815 | 290/53 |
| 8,008,792 B2 * | 8/2011 | Gray | F03B 13/20 | 290/42 |
| 8,030,794 B2 * | 10/2011 | Finnigan | F03B 13/264 | 290/43 |
| 8,278,776 B1 * | 10/2012 | Arntz | F03D 5/00 | 290/54 |
| 8,648,485 B1 * | 2/2014 | Grossi | F03G 1/00 | 290/42 |
| 8,657,575 B2 * | 2/2014 | Morris | F03B 17/06 | 416/79 |
| 8,823,196 B1 * | 9/2014 | Gehring | F03B 13/1885 | 290/42 |
| 8,884,457 B1 * | 11/2014 | Jones | F03B 17/06 | 290/54 |
| 8,901,766 B2 * | 12/2014 | Werjefelt | F03B 13/20 | 290/53 |
| 8,912,677 B2 * | 12/2014 | Dehlsen | E02B 9/08 | 290/53 |
| 9,006,919 B2 * | 4/2015 | Lynch | F03B 17/06 | 290/54 |
| 9,062,649 B2 * | 6/2015 | Greco | F03B 13/1815 | |
| 9,145,866 B1 * | 9/2015 | Patel | F03B 13/1815 | |
| 9,291,147 B2 * | 3/2016 | Jones | F03B 17/06 | |
| 9,464,623 B2 * | 10/2016 | Liu | F03D 7/00 | |
| 9,562,434 B2 * | 2/2017 | Liu | F03B 13/264 | |
| 9,752,552 B2 * | 9/2017 | Yu | F03B 13/183 | |
| 9,995,269 B2 * | 6/2018 | Sung | F16D 43/208 | |
| 2002/0125368 A1 * | 9/2002 | Phelps, III | B64C 27/10 | 244/17.23 |
| 2003/0123983 A1 * | 7/2003 | Bolduc | F03B 17/06 | 416/6 |
| 2004/0007644 A1 * | 1/2004 | Phelps, III | B64C 27/10 | 244/17.11 |
| 2007/0262197 A1 * | 11/2007 | Phelps, III | B64C 27/10 | 244/17.11 |
| 2008/0110168 A1 | 5/2008 | Lopez | | |
| 2008/0122225 A1 * | 5/2008 | Smith | F03B 13/1815 | 290/42 |

(56) References Cited

U.S. PATENT DOCUMENTS

| | | | |
|---|---|---|---|
| 2008/0157532 A1 | 7/2008 | Loui et al. | |
| 2009/0224549 A1* | 9/2009 | Williams | F03D 5/06 290/55 |
| 2009/0224551 A1* | 9/2009 | Williams | F03D 5/06 290/55 |
| 2010/0045044 A1* | 2/2010 | Patterson | F03B 13/1865 290/53 |
| 2010/0064679 A1* | 3/2010 | Straume | F03B 13/1885 60/507 |
| 2011/0042954 A1* | 2/2011 | Werjefelt | F03B 13/20 290/53 |
| 2012/0235413 A1 | 9/2012 | Piccinini | |
| 2013/0076036 A1* | 3/2013 | Liu | F03D 7/00 290/44 |
| 2013/0091838 A1* | 4/2013 | Lee | F03B 13/186 60/506 |
| 2014/0265339 A1 | 9/2014 | Dehlsen | |
| 2015/0159623 A1* | 6/2015 | Frich | F03B 13/1845 290/53 |
| 2015/0275847 A1* | 10/2015 | Sung | F16D 43/208 74/37 |
| 2016/0003213 A1* | 1/2016 | Yu | F03B 13/183 416/6 |

FOREIGN PATENT DOCUMENTS

| | | |
|---|---|---|
| WO | 2013/079585 A1 | 6/2013 |
| WO | 2013/144792 A2 | 10/2013 |

OTHER PUBLICATIONS

International Preliminary Report on Patentability issued in PCT/EP2016/068990 dated Feb. 13, 2018; 9pp.

* cited by examiner

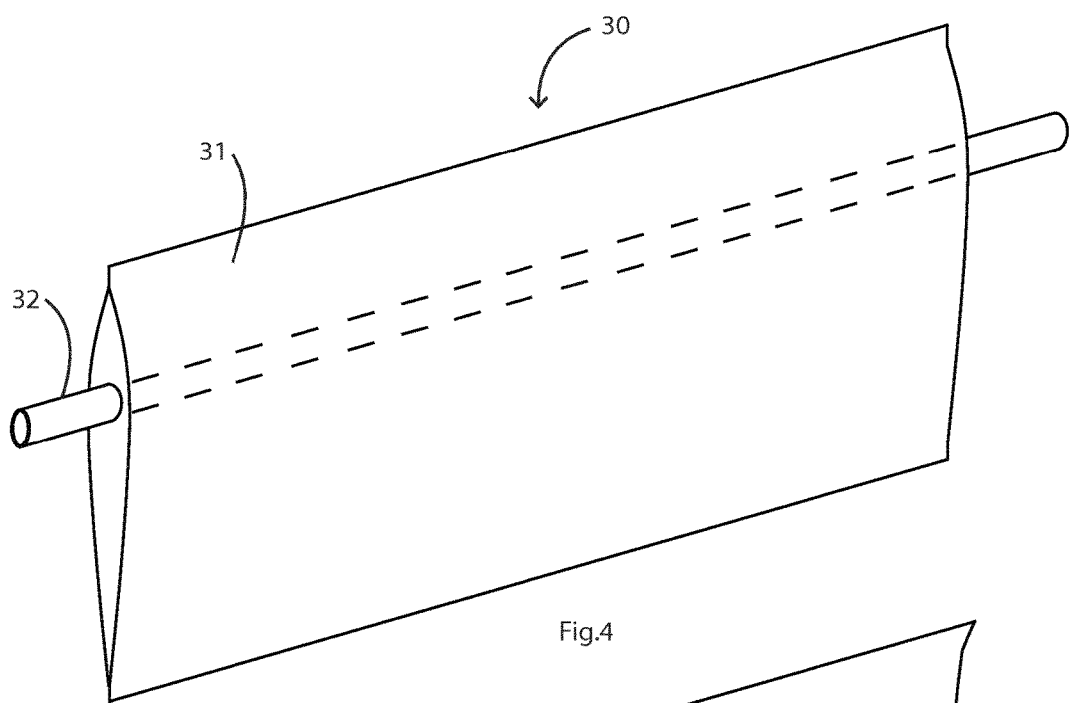
Fig.4
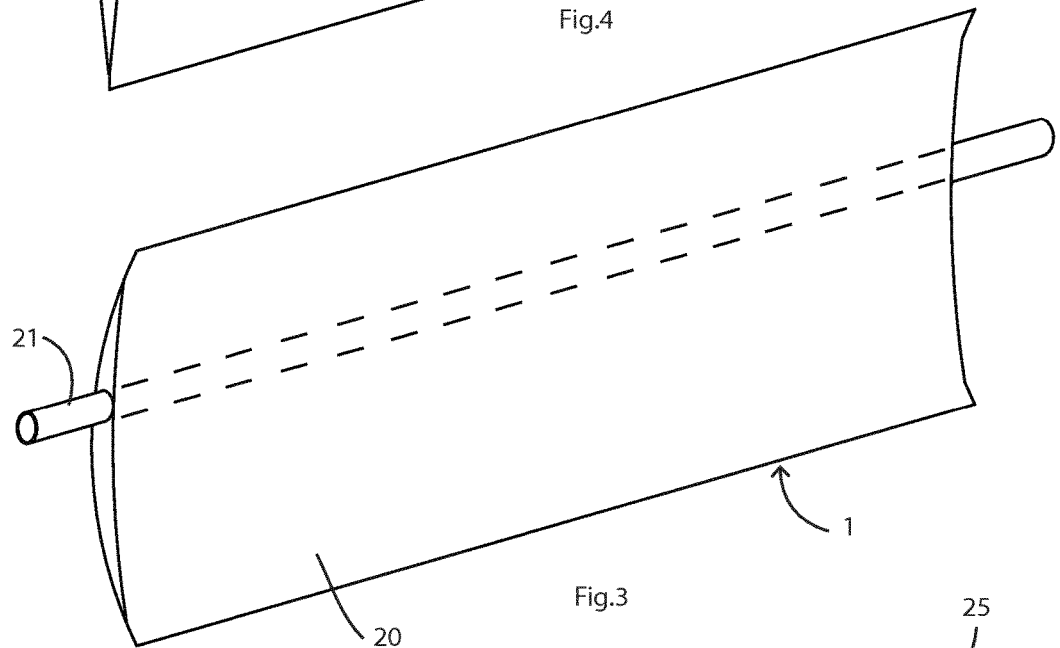
Fig.3
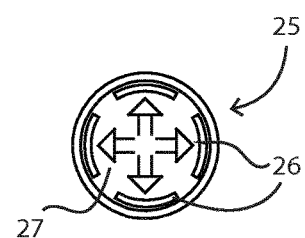

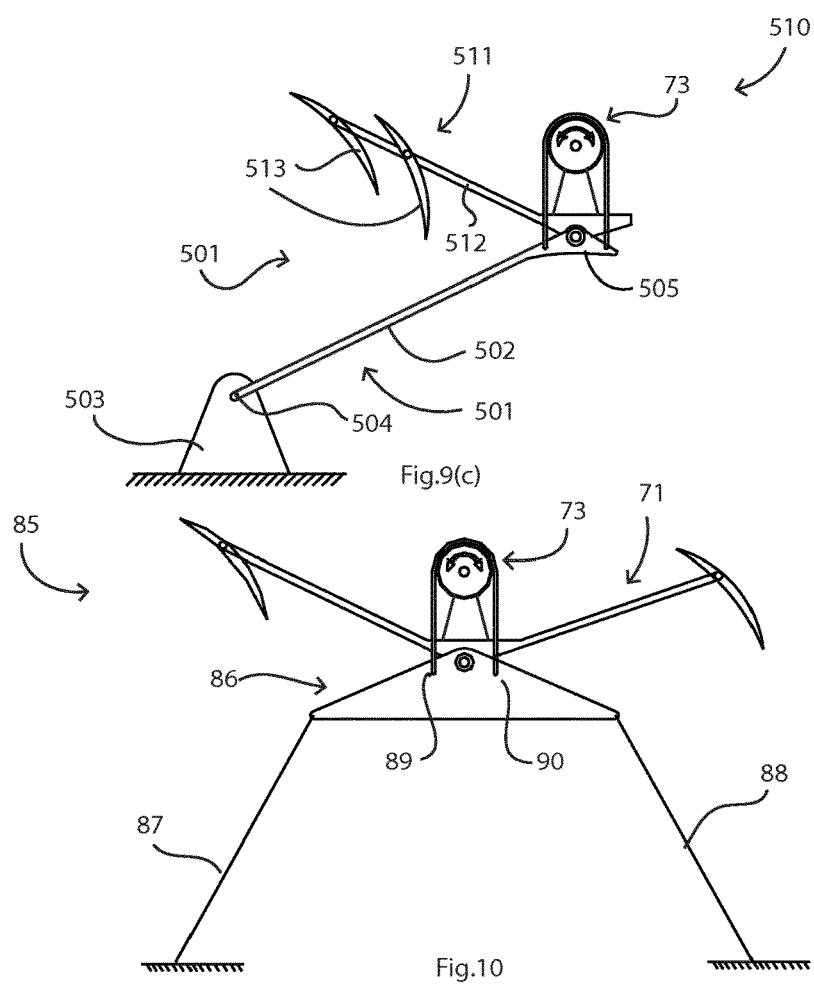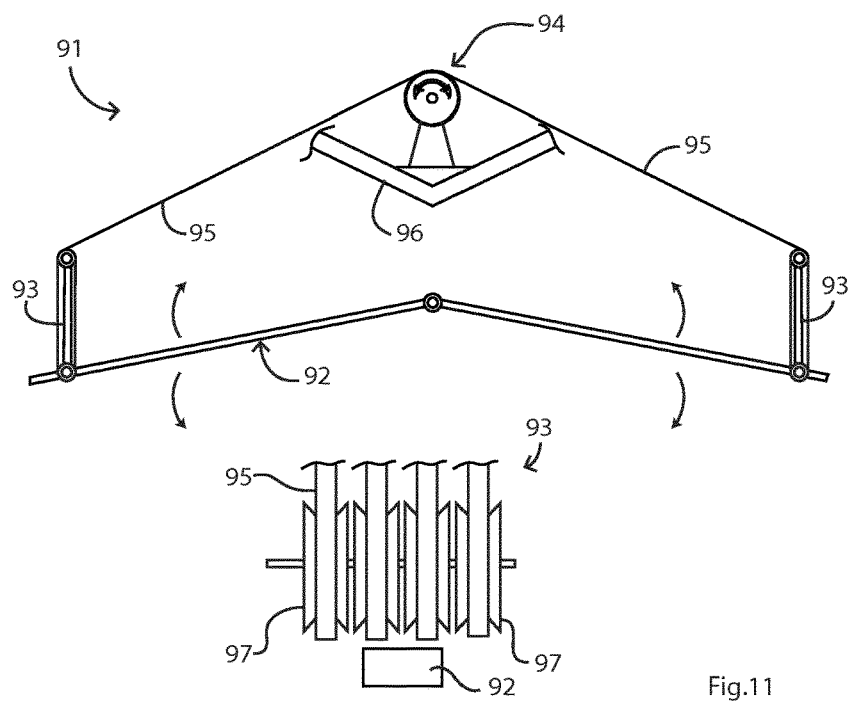

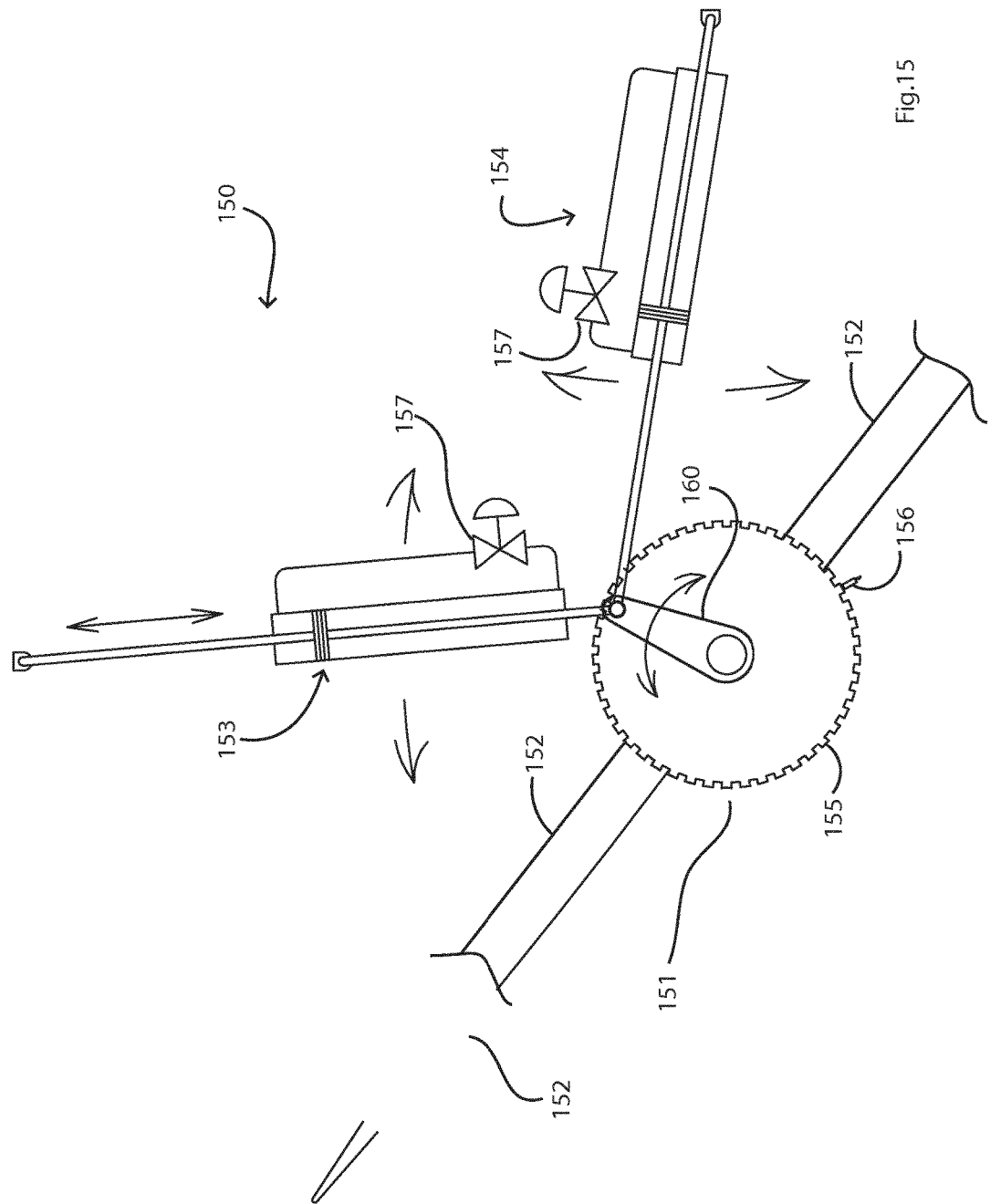

WAVE ENERGY CONVERTOR

INTRODUCTION

Field of the Invention

The invention relates to wave energy converters ("WECs").

Prior Art Discussion

WO2013/079585 (Jospa) describes WECs with fins at different fore-aft positions on an element, to enhance tilting motion of the element, thereby enhancing the relative angle between one element and the next. This contributes to bi-stable positions of the elements.

An object of the present invention is to achieve more effective conversion of wave energy to a useful form such as shaft rotation.

SUMMARY OF THE INVENTION

According to the invention, there is provided a wave energy converter comprising:
- a support frame supporting at least one blade at a fixed angular orientation with respect to the frame;
- a structure;
- a pivot joint pivotally mounting the support frame to the structure about a pivot axis, and
- a power take off mechanism for transferring reciprocating rotary motion of the frame with respect to the structure to an output prime mover.

By having a frame with one or more blade, a considerable extent of reciprocating rotary motion is achieved in a simple manner, with little bulk.

In one embodiment, the frame supports a plurality of blades in spaced-apart relationship. Preferably, at least two blades are on opposed sides of the pivot joint and are spaced-apart by a distance in the range of 30 m to 100 m, preferably 50 m to 80 m. This arrangement is particularly effective because it allows complementary wave action on the blades on both sides of the pivot axis. With the frame facing towards the oncoming waves with the blade lower edges trailing, each oncoming crest raises the blades at its location and the trough lowers the blades at its location at the same time.

In one embodiment, the blades have a generally similar orientation, and said orientation is in the range of 20° to 70° with respect to horizontal in use, with a lower trailing edge with respect to the wave direction.

Preferably, the support frame is buoyant. In one embodiment, the blades have internal buoyancy, and are preferably at least partly hollow. In one embodiment, the blade is mounted on the frame by an adjustment mechanism at an axis which is off-centre in the dimension of the blade from leading edge to trailing edge.

In one embodiment, the blade fixed angular orientation with respect to the frame is adjustable.

In one embodiment, the structure is freely mounted to pivot, and comprises at least one blade having an orientation to operate in the opposite sense to that of the blade of the frame.

In one embodiment, the structure is linked to a mooring.
In one embodiment, the structure is linked to a mooring by a plurality of flexible links.

In one embodiment, the structure is linked to a mooring by a rigid arm, said arm being pivotable about the mooring.

In one embodiment, the power take off mechanism is mounted on the frame and is linked by a drive member such as a chain or belt to the structure.

In one embodiment, the power take off mechanism comprises a mechanical rectifier to convert mutual reciprocating rotary motion of the frame and the structure to unidirectional rotary motion. Preferably, the mechanism comprises a plurality of sprockets or pulleys connected by sprag clutches to a shaft providing output power.

In one embodiment, the sprag clutches are arranged so that power is transferred from the sprockets or pulleys to the shafts so that the shafts contribute to driving the prime mover, or are idle, irrespective of direction of rotation of the sprockets or pulleys. Preferably, a set of a plurality of the sprockets or pulleys are driven by the same chain or belt, and there is a tensioner wheel for the chain or belt, preferably located between two sprockets or pulleys. In one embodiment, the sprockets or pulleys of the set are rotated by the chain or belt in the same direction at any point in time.

In one embodiment, the shafts are interconnected by gears, which are in turn linked to the output prime mover.

In one embodiment, the sprag clutches are arranged so that all of the gears are either driven in the same sense or are idle at any time.

In one embodiment, the pulleys are driven by a belt or chain which includes an accumulator along its length. Preferably, the accumulator is adjacent an extremity of a structure. In one embodiment, there is an accumulator at each end of the belt or chain. In one embodiment, the accumulator comprises a plurality of pulleys in at least two spaced-apart sets.

In one embodiment, the converter further comprising a generator and at least one sensor to detect relative rotation of the support frame and the structure about said pivot joint, and a controller to control the generator for optimum operation according to movement of the rotating parts.

In one embodiment, the controller is configured to minimise inertia of the generator so that the speed is continually varying to follow the wave input. In one embodiment, the controller is configured to reduce or cut off field current in the generator near the crests and troughs to allow a generator rotor to maintain some momentum. In one embodiment, the controller is configured to vary generator field current in approximate proportion to rate of change of relative angle between the frame and the structure.

In one embodiment, the sensor comprises a gyroscopic sensor or accelerometer on each structure, and the controller is configured to combine sensed motion.

In one embodiment, the frame comprises a blade adjustment mechanism for locking a blade at a fixed angle relative to the frame for an operative orientation, and for releasing the blade for streamlining In one embodiment, the adjustment mechanism comprises an hydraulic actuator and a valve to allow free flow of actuation oil flow for streamlining In a further aspect, the invention provides a power transfer mechanism for converting reciprocating rotary input power of wave energy converter parts to unidirectional rotary output power, the mechanism comprising a plurality of sprockets or pulleys connected by sprag clutches to shafts, and said shafts are linked to an output prime mover.

In one embodiment, the sprag clutches are arranged so that power is transferred from the sprockets or pulleys to the shafts so that the shafts contribute to driving the prime mover, or are idle, irrespective of direction of rotation of the sprockets or pulleys.

In one embodiment, a set of a plurality of the sprockets or pulleys are driven by the same chain or belt.

In one embodiment, the sprockets or pulleys of the set are rotated by the chain or belt in the same direction.

In one embodiment, the shafts are interconnected by gears, which are in turn linked to the output prime mover.

In one embodiment, the sprag clutches are arranged so that all of the gears are either driven in the same sense or are idle at any time.

In one embodiment, the converter further comprising a generator linked with the output, a sensor to detect mutual rotation of the wave energy converter parts, and a generator controller to disable the generator as mechanical input power is near zero in each input power cycle.

In another aspect, the invention provides a wave energy converter convertor comprising:
an elongate support;
a plurality of blades mounted on the elongate support along its length,
blade restraints arranged to allow blade rotation in one direction with streamlining but rotation in the opposite direction up to a limit at which a wave imparts energy to move a vessel attached to an end of the elongate support.

In one embodiment, the support has a length of greater than 100 m, and the combination of the support and the blades is buoyant. In one embodiment, the blades rotate about a horizontal axis. Alternatively the blades rotate about a vertical axis.

In another aspect, the invention provides a floating vessel comprising a mooring and at least two blades, at least one located near the bow and at least one other blade located near the stern, the blades being orientated so that oncoming waves tend to push the bow down at a crest and the stern up at a trough. In one embodiment, the blades are separated by a distance in the range of 30 m to 100 m.

Additional Statements

According to the invention, there is provided a wave energy converter comprising:
at least one blade,
a support structure supporting the blade or blades,
a pivot joint for the support structure, and
a power transfer mechanism for transferring reciprocating rotary motion of the structure about the pivot joint to an output.

In one embodiment, the structure supports a plurality of blades.

In one embodiment, the support structure supports a plurality of blades in spaced-apart relationship. In one embodiment, the blades are spaced-apart by a distance in the range of 30 m to 100 m, preferably 50 m to 80 m. In one embodiment, the blades have a generally similar orientation. In one embodiment, the orientation is in the range of 20° to 70° with respect to horizontal in use. In one embodiment, the blades have internal buoyancy, by for example being at least partly hollow.

In one embodiment, the blades have a fixed operative position on the support structure. In one embodiment, the fixed position is adjustable.

In one embodiment, the converter comprises at least one additional structure pivotable on the pivot joint or an adjacent joint, on which is mounted at least one blade. In one embodiment, the blade or blades of the second structure have an orientation to operate in the opposite sense to that of the blades of the first structure.

In one embodiment, there is an upper structure and a lower structure. In one embodiment, the lower structure is freely mounted to pivot. In one embodiment, the lower structure is linked to a mooring. In one embodiment, the lower structure is linked to a mooring by a flexible link. In one embodiment, there are a plurality of flexible links.

In one embodiment, the lower structure is linked to a mooring by a rigid arm, said arm being pivotable about the mooring.

In one embodiment, either one or both of the upper and lower structures comprises one or both arms on either side of the pivot joint. In one embodiment, the power transfer mechanism is mounted on one structure and is lined by a drive member such as a chain or belt to the other structure.

In one embodiment, the power transfer mechanism is configured to convert mutual reciprocating rotary motion provided by the structure or structures to continuous rotary motion for a generator. In one embodiment, the mechanism comprises a plurality of sprockets or pulleys connected by sprag clutches to shafts, and said shafts are linked to an output prime mover.

In one embodiment, the sprag clutches are arranged so that power is transferred from the pulleys to the shafts so that the shafts contribute to driving the prime mover, or are idle, irrespective of direction of rotation of the sprockets or pulleys.

In one embodiment, a set of a plurality of the sprockets or pulleys are driven by the same chain or belt. In one embodiment, the sprockets or pulleys of the set are rotated by the chain or belt in the same direction. In one embodiment, the shafts are interconnected by gears, which are in turn linked to the output prime mover. In one embodiment, the sprag clutches are arranged so that all of the gears are either driven in the same sense or are idle at any time.

In one embodiment, the pulleys are driven by a belt or chain which includes an accumulator along its length.

In one embodiment, the accumulator is adjacent an extremity of a support. In one embodiment, there is an accumulator at each end of the belt or chain. In one embodiment, the accumulator comprises a plurality of pulleys in at least two spaced-apart sets.

In one embodiment, the system further comprises at least one sensor to detect rotation of rotating parts, and a controller to control the generator for optimum operation according to movement of the WEC rotating parts.

In one embodiment, the controller is configured to minimise inertia of the generator so that the speed is continually varying to follow the wave input. In one embodiment, the generator controller is configured to reduce or cut off field current in the generator near the crests and troughs to allow a generator rotor to maintain some momentum. In one embodiment, the generator controller is configured to vary generator field current in approximate proportion to relative angular change of the structures.

In one embodiment, the sensors comprise a gyroscopic sensor or accelerometer on each structure, and the controller is configured to combine sensed motion.

In another aspect, the invention provides a wave energy converter convertor comprising:
an elongate support,
a plurality of blades mounted on the elongate support along its length, and
blade restraints arranged to allow blade rotation in one direction with streamlining but rotation in the opposite direction up to a limit at which a wave imparts energy to move a vessel attached to an end of the elongate support.

In one embodiment, the blades rotate about a horizontal axis. In one embodiment, the blades rotate about a vertical axis.

In a further aspect, the invention provides a floating vessel comprising a mooring and at least two blades, at least one located near the bow and at least one other blade located near the stern, the blades being orientated so that oncoming waves tend to push the bow down at a crest and the stern up at a trough. This is especially advantageous for static floating vessels.

In a further aspect, the invention provides a power transfer mechanism for converting reciprocating rotary input power to uni-directional rotary output power, the mechanism comprising a plurality of sprockets or pulleys connected by sprag clutches to shafts, and said shafts are linked to an output prime mover.

In one embodiment, the sprag clutches are arranged so that power is transferred from the pulleys to the shafts so that the shafts contribute to driving the prime mover, or are idle, irrespective of direction of rotation of the sprockets or pulleys.

In one embodiment, a set of a plurality of the sprockets or pulleys are driven by the same chain or belt. In one embodiment, the sprockets or pulleys of the set are rotated by the chain or belt in the same direction. In one embodiment, the shafts are interconnected by gears, which are in turn linked to the output prime mover. In one embodiment, the sprag clutches are arranged so that all of the gears are either driven in the same sense or are idle at any time. In one embodiment, the mechanism further comprises a generator linked with the output, sensor to detect rotation of a rotating part, and a generator controller to disable the generator as mechanical input power is near zero in each input power cycle.

DETAILED DESCRIPTION OF THE INVENTION

The invention will be more clearly understood from the following description of some embodiments thereof, given by way of example only with reference to the accompanying drawings in which:

FIG. 3 is a perspective view showing a blade of the WEC of FIGS. 1 and 2 with details of a clutch, while FIG. 4 shows an alternative blade construction;

Figure 5:
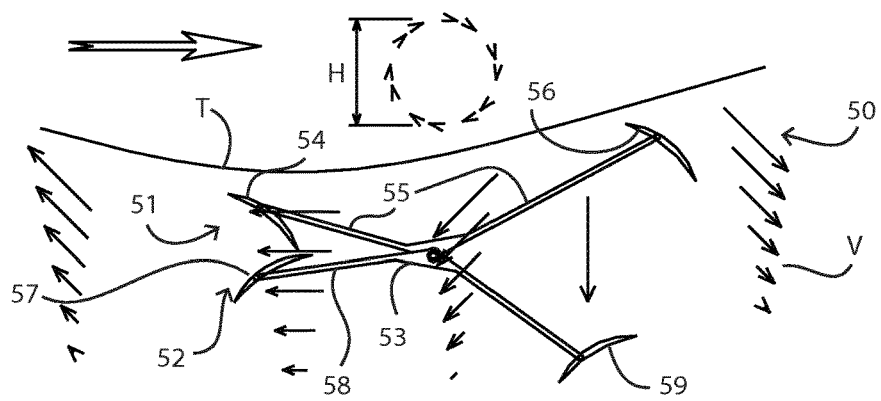
Figure 6:
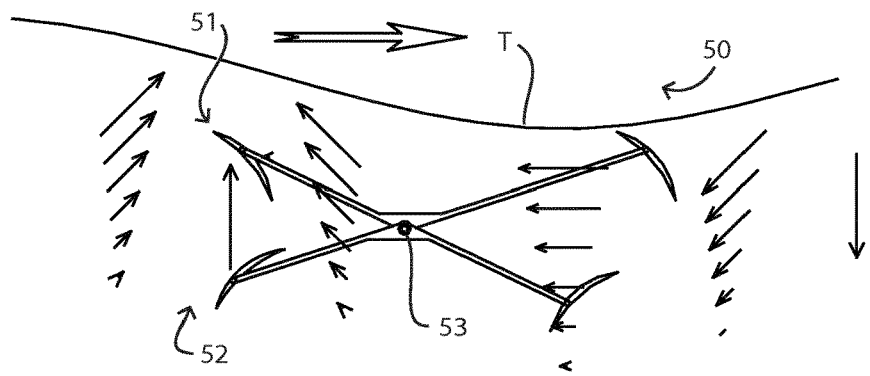
Figure 7:
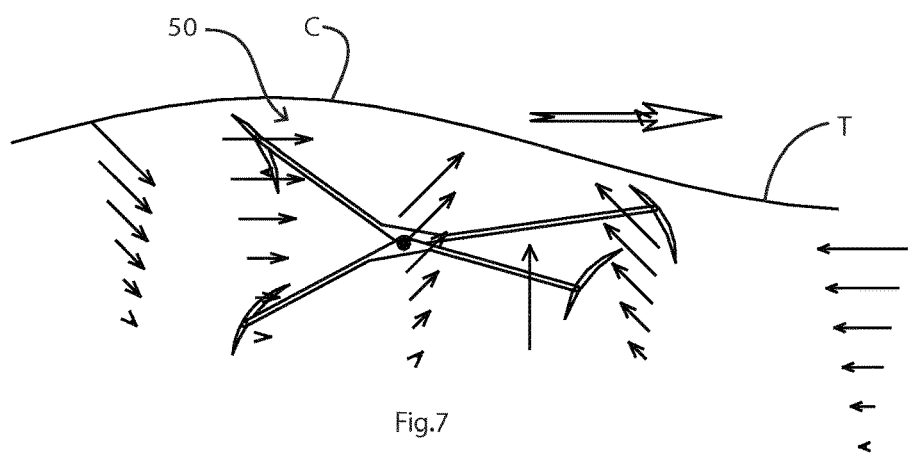
Figure 8:
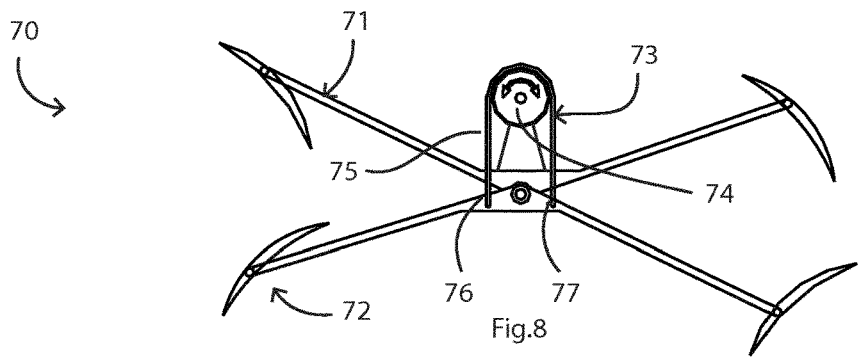
Figure 12A:
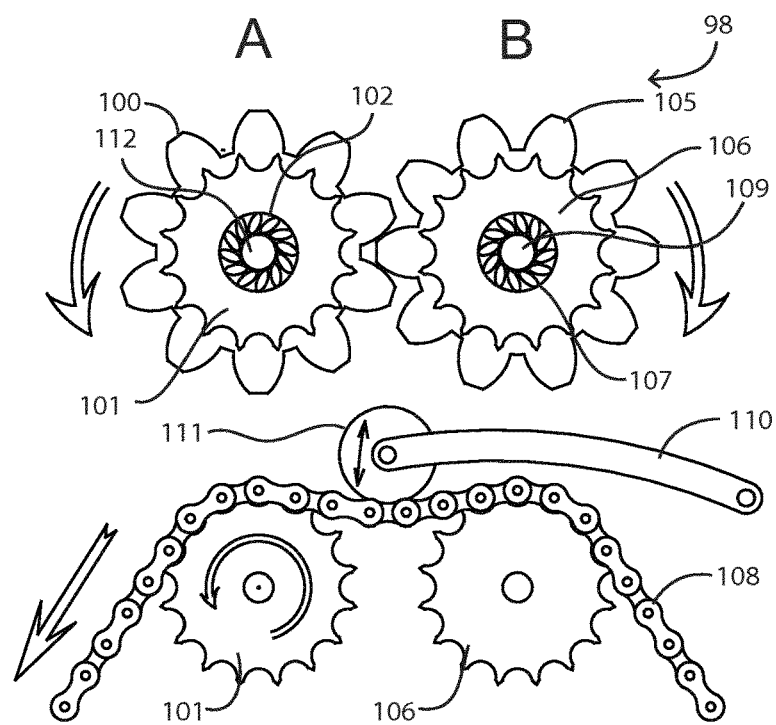
Figure 12B:
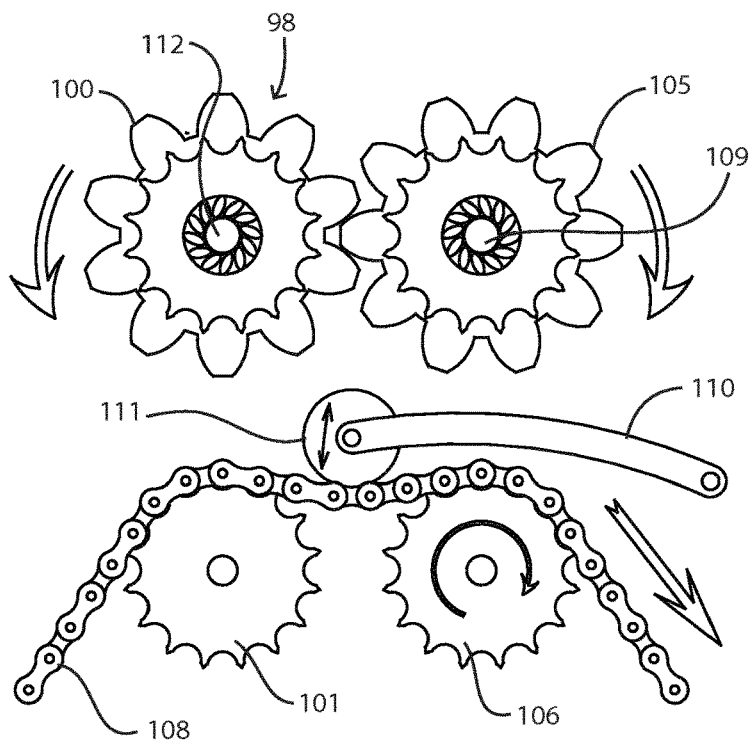
Figure 13A:
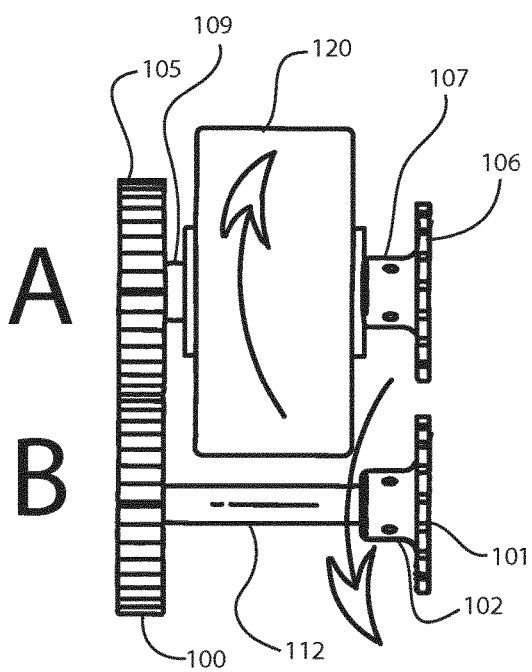
Figure 13B:
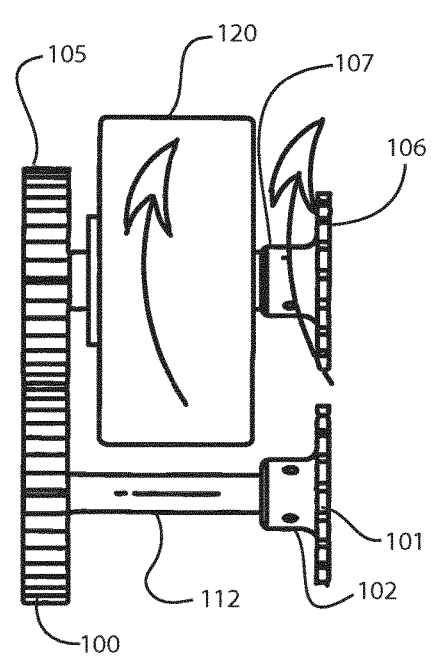
Figure 16:
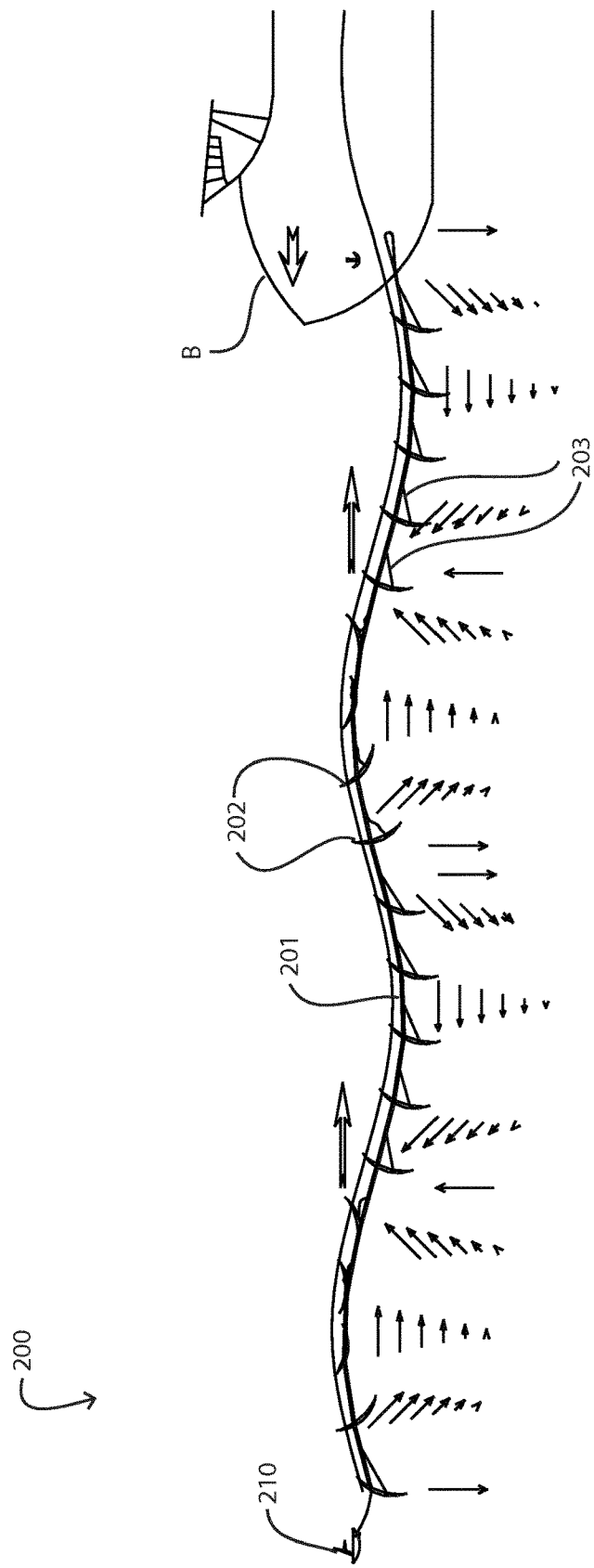
Figure 17:
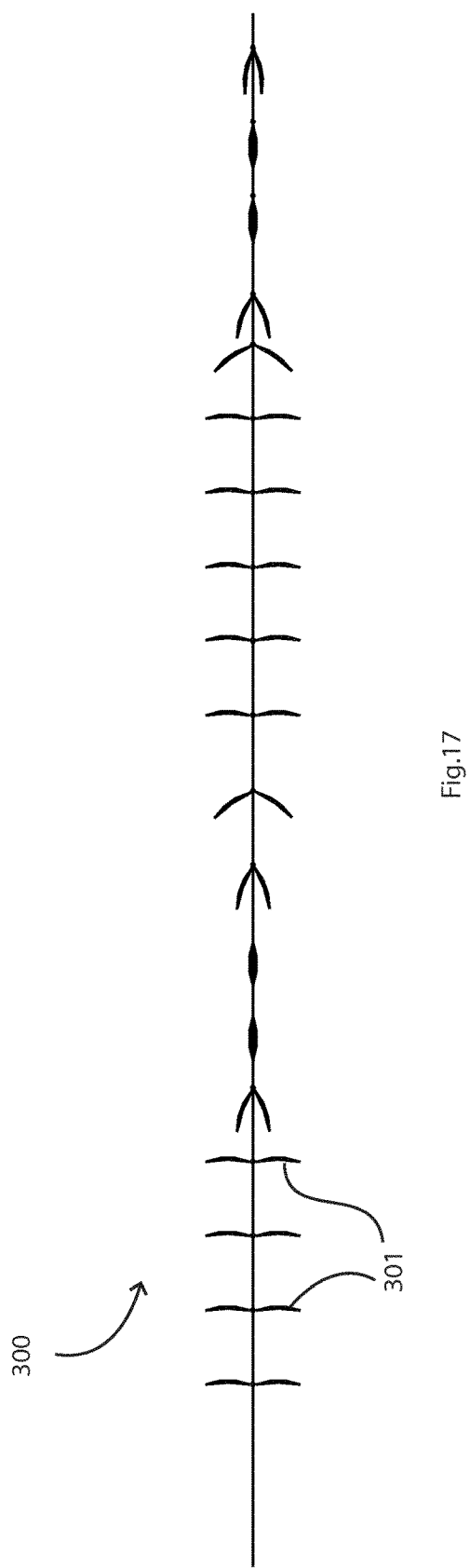

FIGS. 5, 6, and 7 are diagrams, as a wave passes (with time), illustrating operation of a WEC having two co-axial support structures;

FIG. 8 is a diagram illustrating another WEC having two structures, showing a power take off mechanism, and FIGS. 9(a), 9(b), 9(c), and 10 are diagrams showing alternative embodiments;

FIGS. 11 is a pair of diagrams showing an alternative link to a power take off mechanism, with an accumulator to speed up rotation;

FIGS. 12(a) and 12(b) are diagrams illustrating operation of a power take off mechanism in more detail;

FIGS. 13(a) and 13(b) are plan views of the power take off mechanism of FIG. 12 in use;

FIG. 14 is a diagram illustrating relationship between output power and waves;

FIG. 15 is a side view of a blade rotary position adjustment mechanism of one embodiment;

FIG. 16 shows a WEC arranged for towing a large boat B;

FIG. 17 is a plan view showing a variation on the embodiment of FIG. 16; and

Figure 18A:
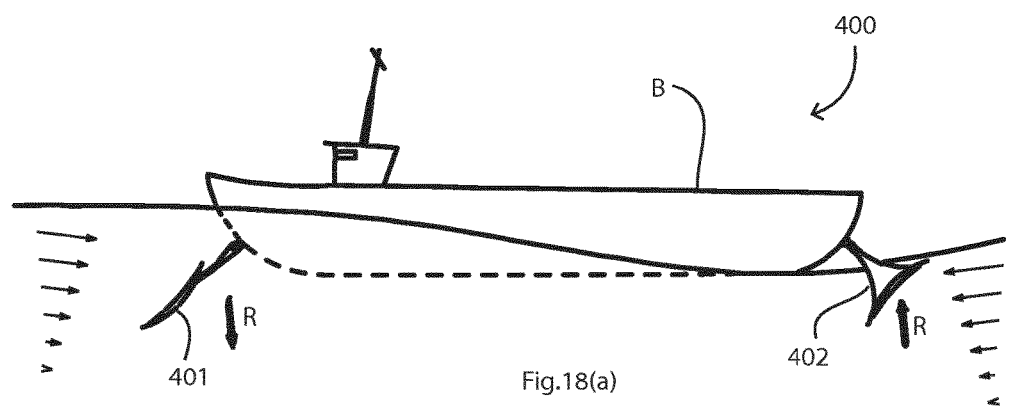
Figure 18B:
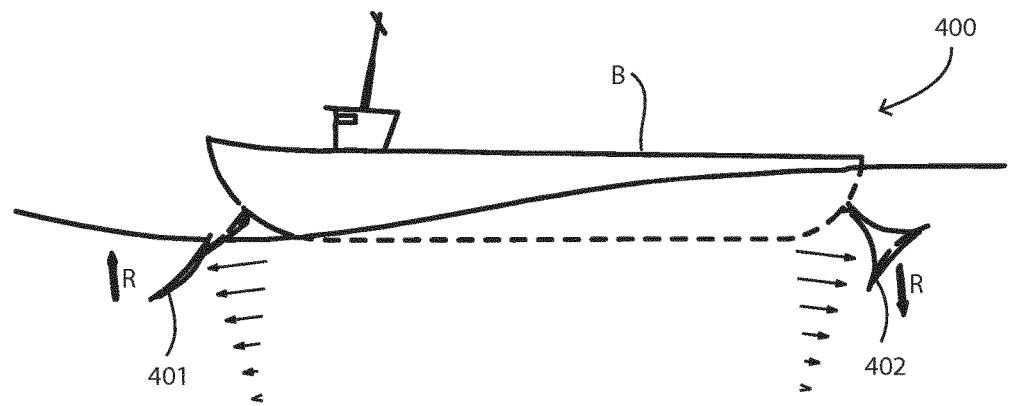

FIGS. 18(a) and 18b) are diagrams illustrating an apparatus for stabilizing a moored boat.

DESCRIPTION OF THE EMBODIMENTS

Figure 1:
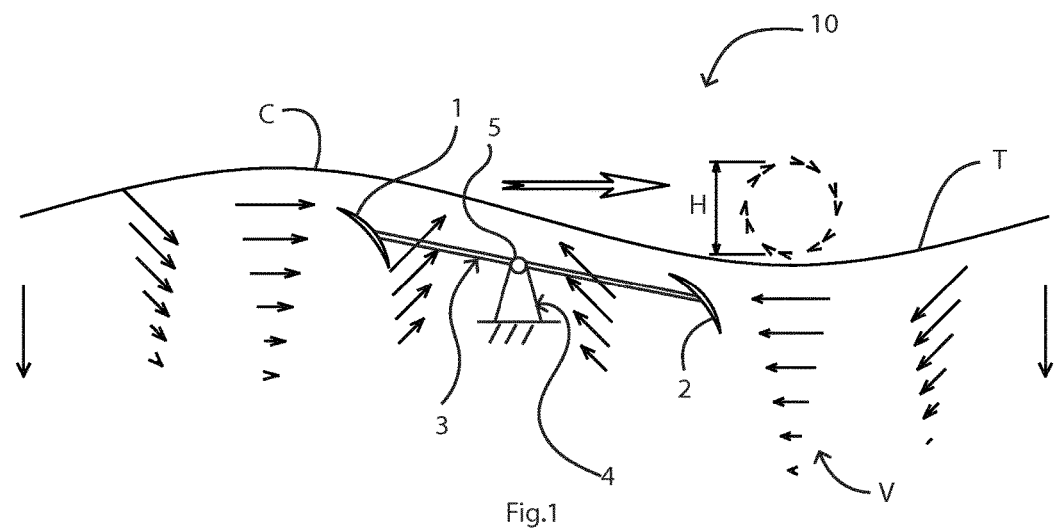
FIGS. 1 and 2 are diagrams showing basic operation of WECs of the invention in some embodiments.

Referring to FIG. 1 a wave energy converter ("WEC") 10 of one embodiment has hydrofoil blades 1 and 2 mounted on a support frame 3, in turn pivotally mounted on a reaction structure 4. The support frame 3 pivots about a central pivot axis in a reciprocating manner on the structure 4, about a pivot joint 5. The frame 3 is in the form of a bar forming integral radial arms, with the blades 1 and 2 mounted in a fixed manner at the ends. The blades have an angle with respect to horizontal in which their medial planes are directed about 45° to horizontal, with the lower edge trailing with respect to the wave direction. More generally the angle is in the range of about 20° to 70° with respect to horizontal.

Waves are illustrated with crests C and troughs T, and local water movement is illustrated diagrammatically by vectors V. As is well known, within a wave, the water molecules move in a circular motion as viewed from the side. Also, the further down below the water surface the smaller the movement. In fact the movement, and consequently the wave energy forces, reduce exponentially with depth as illustrated diagrammatically by the velocity vectors.

The blades 1 and 2 are hollow, and hence inherently buoyed. The blades of the various embodiments may be variously referred to as "fins" or "hydrovanes" and these terms are interchangeable.

By way of example, the blades 1 and 2 are mounted so that a median plane of each extends at approximately 45° from a top edge at a forward position relative to the wave direction to a bottom edge at a rearward position. The blades 1 and 2 are arranged to have concave surfaces facing the wave direction as illustrated.

The separation of the blades 1 and 2 is approximately 40% of a typical wavelength for the intended use, in one example 60 m. The blade width can be as desired, preferably greater than 5 m and more preferably in the range of 20 m to 30 m. Consequently, when the leading blade 1 has water incident in the wave direction (the crest) the trailing blade 2 has water incident in the opposite direction (the trough). Hence, the blades 1 and 2 act in a complimentary manner, both clockwise about the pivot joint 5 between them (the pivot axis being through the plane of the page as illustrated). Each blade is pushed further up at a crest C, and is pushed further down at a trough T, thereby having an enhanced up-down reciprocating rotary motion.

As shown in in more detail in the following embodiments the WEC also includes a power take off mechanism to transfer this reciprocating rotary motion of the blade frame to an output prime mover. This transfer may convert the reciprocating motion to uni-directional rotary motion. This reciprocating motion is of the blade frame about a pivot joint on the reaction structure, this structure being a body reacting against the forces applied to the blades by the waves, thereby achieving the reciprocating pivoting motion.

Figure 2:
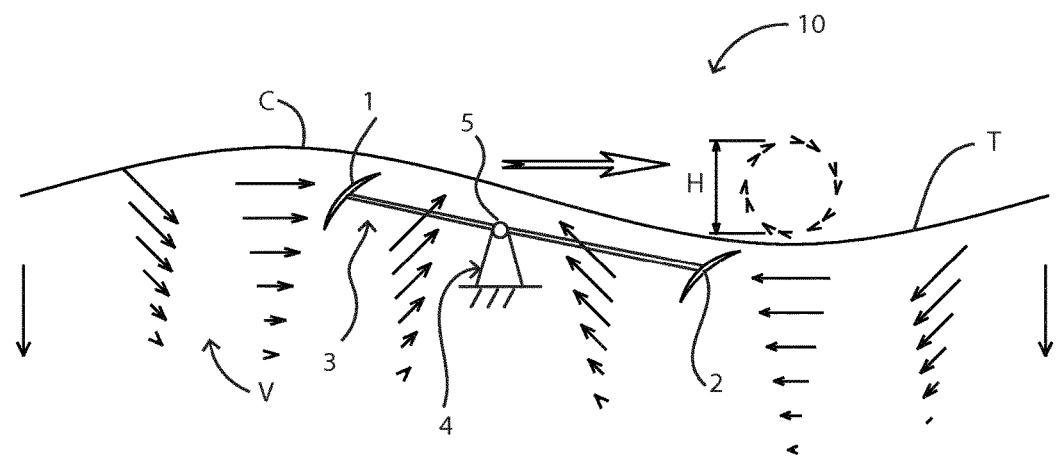

FIG. 2 shows the WEC 10 having blades 1 and 2 after they have been rotated through 90° to a maintenance, inoperative, orientation. The blades 1 and 2 extend in a "south west"-"north east" direction as illustrated. Hence for the same incident wave direction they rotate anti-clockwise about the pivot axis. At a crest C at the blade 1 or 2 the blade is pushed down and at a trough it is pushed up. This may be regarded as a stabilisation mode because the frame remains substantially level, and this is suitable in very rough conditions and for maintenance. This is because although the blades are urged in the opposite sense to the direction of FIG. 1, the upward pressure is at a trough and so there is very little scope for upward movement. Moreover, at a crest the water circular motion is urging the blade down, against the force of the inherent buoyancy of the blade. Thus, while it may appear that the mode of FIG. 2 would provide reciprocating motion, in reality if provides little due to these two factors.

This blade orientation can be achieved by an adjustment mechanism rotating the blades to the new fixed position. The mode can be changed by releasing a latch and allowing natural rotation to the optimum position by wave action without need for a drive. The lock may then be re-applied.

Alternatively, the mode change can be accomplished by rotating the WEC about a vertical axis (plane of the page in the views) through 180°. However, in many circumstances this would not be practical.

The blade 1 is shown in FIG. 3. It has a hollow body with a concave skin on one side and a convex skin on the other side. A hollow shaft 21 runs through it. In normal operation the blade body 20 is fixed on the shaft 21. However, as shown in the bottom of FIG. 3 there may be an internal clutch 25 with engaging pads 26 and 27 to lock a particular desired angular position on the shaft. This may be to suit weather conditions for optimum power, or as shown in FIG. 2, to do maintenance. Also, in stormy conditions the brake may be released completely, allowing the blades to streamline freely. This avoids considerable complexity and cost involved in over-engineering to cater for extreme conditions.

The fact that the blade body is hollow provides considerably buoyancy, enough to maintain flotation of the WEC FIG. 4 shows an alternative blade, 30, having a body 31 which is symmetrical with convex skins on both sides. A shaft 32 extends through the body 31. The location of the shaft 32 is preferably off-centre in the dimension of the blade from leading edge to trailing edge. This provides the advantages of the blade lining up with the water when the brake is released. It also minimises the sweep distance of the blade for a given angle change. It also helps structural strength.

Referring to FIGS. 5 to 7 a WEC 50 comprises a blade support frame 51 and a lower structure 52, both rotating co-axially on a pivot joint 53. The frame 51 has leading and trailing blades 54 and 56 (with respect to the left-right wave direction used in this specification) on support arms 55. These are arranged like the blades 1 and 2 of FIG. 1. The structure 52 has leading and trailing blades 57 and 59 on support arms 58. The blades 57 and 59 are arranged like the blades 1 and 2 of FIG. 2. Hence the structure 52, although it has blades 57 and 59, is relatively stable for the reasons given above with respect to FIG. 2, and it can act as a reaction structure for the reciprocating motion of the frame 51.

As shown, as a full wave passes the major stages are as follows:
  (a) Trough approaching (FIG. 5). Frame 51 anti-clockwise and structure 52 clockwise to a lesser extent.
  (b) Crest approaching (FIG. 6). Change to frame 51 clockwise and structure 52 anti-clockwise, again the latter being to a lesser extent.
  (c) Crest. Frame 51 clockwise, structure 52 anti-clockwise and about to change to the opposite sense.

There is therefore repeated cyclic mutual rotation about the pivot shaft 53 in a scissors-like action. Examples of known power transfer mechanisms for providing an output to a prime mover from reciprocating rotary motion are pistons for hydraulic linear motors and water pumps. As described below the mechanism may include a rectifier.

Referring to FIG. 8 a WEC 70 is similar to the WEC 50 and additionally shows a power transfer mechanism 73 for transferring power arising from mutual rotation of a frame 71 a structure 72. The mechanism 73 has a shaft gear drive 74 mounted on the frame 71 and acted upon by a belt 75 linked at both ends to the structure 72. The belt 75 therefore repeatedly moves back-and-forth in clockwise and anti-clockwise actions on the gear train 74. This power take off mechanism 73 provides reciprocating output motion to a prime mover.

Figure 9A:
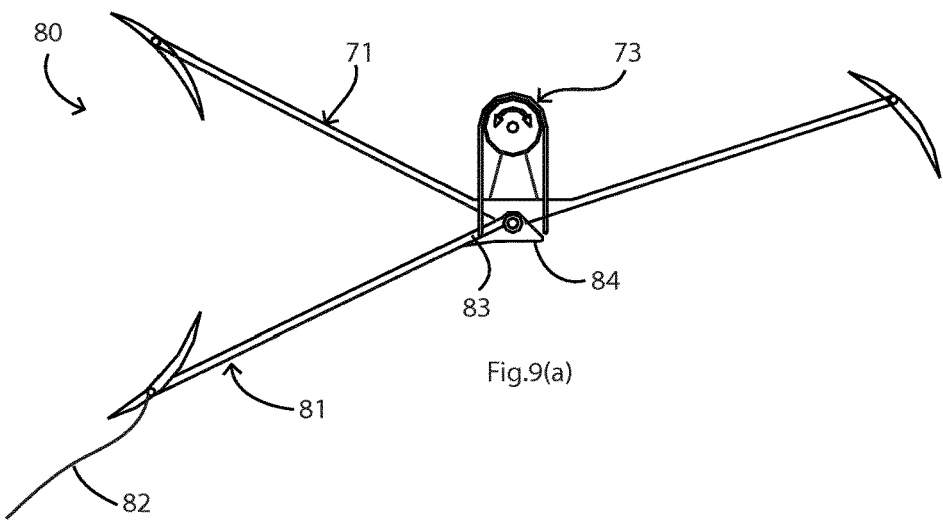

Referring to FIG. 9(a) a WEC 80 has the frame 71, and a reaction structure 81 linked to a mooring line 82. The mechanism 73 receives a similar reciprocating input, but the structure 81 has less material, and rotates less due to it being connected to the mooring 82. In another embodiment, the structure 81 is much closer to the water surface, arranged closer to horizontal.

Figure 9B:
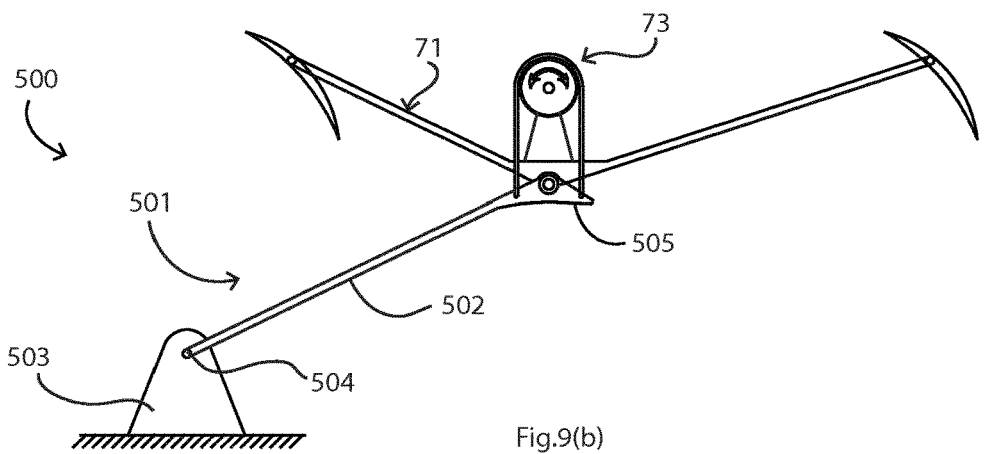

Referring to FIG. 9(b) a WEC 500 has the frame 71 and the power take off mechanism 73. However, in this case a structure 501 comprises an arm 502 pivoted about a common axis 505 at its upper end, and pivoting about a joint 504 fixed to the sea bed at a lug 503. Alternatively, the arm 502 may be pivotally connected at its lower end to a lug or other connector on a man-made structure at a higher level. Again, there is mutual rotation about the common axis (53) and reciprocating power into the mechanism 73. The vast majority of the reciprocating motion is by the frame 71, with little contributed by the structure 502.

Referring to FIG. 9(c) in a variation of the WEC 500, a WEC 510 has the structure 501 and the power take off mechanism 73. In this case, however, the pivoting frame 511 has a single arm 512 pivoting about the joint 505 and having two blades 513. Less material is required in this embodiment, and overall size is smaller.

It has been found that the reaction structure being a pivoting mooring rig allows the PTO to capture some heave motion of the whole rig as well as the pitching motion of the blade frame.

Referring to FIG. 10 a WEC 85 has the frame 71 and a reaction structure 86 which is connected by mooring lines 87 and 88 at its ends. The structure 86 reciprocates to a small extent about the common axis. Both moorings 87 and 88 are taut moored.

It will be appreciated that any of the reaction structures of any embodiment may be used with the pivoting frames of any embodiment.

Referring to FIG. 11 a WEC 91 has a reaction structure 92 linked via an accumulator (or "multiplier" mechanism 93 to a power transfer mechanism 94. A cable extension 95 to a chain or toothed belt is connected at each end to the structure 92 via the accumulator/multiplier 93 at each end. The mechanism 94 is on a top pivoting frame 96. Each accumulator 93 comprises two series of multiple parallel pulleys 97. Hence, for a 1 m movement of the structure 92 at its ends there is an 8 m slackening or pulling of the belt 95, one per length between the sets of four pulleys 97. There is therefore magnified speed of the belt through the system 94. For each relative movement of 1 m between the opposed ends, the chain extends or contracts by 2 n×1 m, n being the number of tensioning loops. This will typically increase chain/cable 95 speed by the multiplier, while reducing the chain/cable 95 force by this factor. This provides the benefit of more revolutions of generator rotor per wave and faster rotation speed. The generator can therefore be lighter and/or smaller.

Referring to FIGS. 12(a) and 12(b) the power transfer mechanism may comprise a mechanical rotation rectifier 98 to convert reciprocating rotary motion to single-direction rotary motion. In each of FIGS. 12(a) and 12(b), the bottom view is what is visible from the front, whereas the top view shows the (hidden) sprag clutch and the gears behind.

The rotation rectifier 98 comprises a gear 100, a sprocket (or pulley) 101 for a chain 108 (or toothed belt), and a sprag clutch 102 between the sprocket 101 and the gear 100. The clutch 102 has teeth arranged to be driven by the sprocket 101 only with anti-clockwise sprocket rotation, and to free-wheel with clockwise sprocket rotation.

There is also a gear 105 engaging the gear 100, and being linked to a sprocket 106 by a sprag clutch 107 for driving only in the clockwise direction.

The input to the rectifier 98 is the chain 108, while the output is a shaft 109. The shaft 109 is fast on the gear 105. The gear 105 drives a generator. The gear 100 is also on a shaft 112, the sprocket 101 being linked to the shaft 112 via the sprag clutch 102

The chain 108 is tensioned by a tensioner having an arm 110 and a wheel 111 and runs over both sprockets 101 and 106. There may alternatively be a tensioner wheel at a lower position between the sprockets, thus extending the range of slack take-up. Advantageously, the idler wheel 100 is located between two alternately driven sprockets 101 and 106. Hence, the idler is always at the optimum location, at the slack end of the driven sprocket.

As shown in FIG. 12(a), where the chain 108 moves to the left:
  the sprocket 101 rotates anti-clockwise,
  the clutch 102 is engaged, driving the gear 100 on the shaft 112 anti-clockwise,
  the gear 105 is driven clockwise by the gear 100,
  gear 105 drives the output shaft 109 clockwise,
  the sprocket 106 free-wheels.

For right movement of the chain 108 the sprocket 106, as shown in FIG. 12(b), is driven clockwise, thereby engaging the shaft 109 to turn clockwise. This continues the uni-directional output of the output shaft 109. Meanwhile, the gear 105 is driven clockwise, causing the gear 100 to rotate anti-clockwise, however the gear 100 just free-wheels as it does not drive the sprocket 101.

Referring to FIGS. 13(a) and 13(b) the physical arrangement is shown in plan view. These views show the generator 120, and the output shaft of the gear 105. The arrows demonstrate that the generator 120 is driven in the same direction irrespective of the chain direction.

The sprockets alternate their rotation direction, but always rotate in unison, clockwise or anti-clockwise. The gears always counter rotate, but always in the same rotation direction.

Referring to FIG. 14, the generator may be electrically controlled by selectively cutting its field current as wave troughs approach and the chain changes direction. This may be sensed by an accelerometer or other sensor on a structure. This helps to avoid sudden input to the generator at this part of each cycle, and therefore the gearing system does not lose angular velocity.

Figure 14A:
Figure 14B:
Figure 14C:
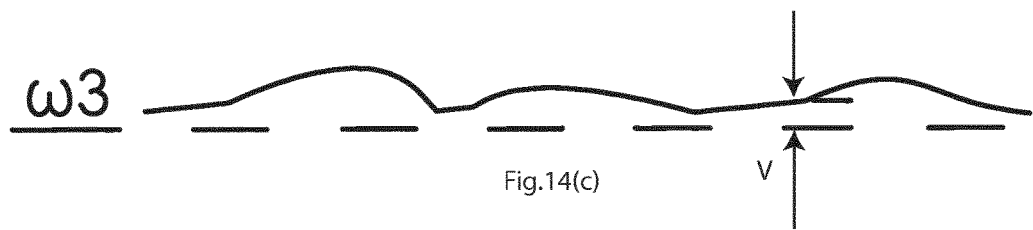

FIG. 14(a) shows the input angular velocity—alternating, but each cycle different due to the wave variability. FIG. 14(b) shows the output of the rotation rectifier, only positive but dipping to zero twice per cycle. FIG. 14(c) shows a modified output arising, in one embodiment, from armature current control in which it is cut at parts of the cycle 10 to prevent the output from reaching zero. This prevents the generator from losing significant momentum. Also, it avoids excessive forces due to sudden accelerations, and hence avoids problems arising from extremes of input wave power. This also permits higher rotational speeds. The minimum velocity reached is denoted V in FIG. 14(c).

Hence, in at least some embodiments the rotation rectifier differs significantly from the prior approaches which employ flywheels with high rotational inertia. In the invention inertia of the generator rotor is minimised so that the speed is continually varying so as to follow the wave input. For optimal energy extraction from a wave the WEC is loaded in proportion to the velocity caused by the wave. So, near the crests or troughs the relative angular change around the pivot decreases towards zero, and the generator controller reduces the field current in the generator to allow the rotor to maintain some of its momentum. On the other hand, at approximately half way between a crest and a trough, the two structures are moving apart or together in a scissors-like action at the fastest rate. This is where the controller loads on the maximum field current. This approach allows the rotor to speed up and down to track the wave and so extract maximum power. This is the approach for both small and large waves.

The sensor arrangements to track the movement may for example comprise both upper gyro and lower gyro sensors on the two frames. The controller combines the two rotations sensed and amplifies the output before feeding it to a brake and/or generator. Any other suitable sensors to track the movement cycles would be employed, provided their response is sufficient to allow the controller to apply the loading in approximate proportion to the angular rate of change.

Referring to FIG. 15 a blade angle adjustment mechanism 150 is illustrated. It comprises an encoder disc 151 fast on a blade 152, and these together can rotate as one unit about the frame (not shown) for blade angle adjustment before use. The disc 151 includes peripheral teeth 155, and there is an inductive sensor 156 for detecting angular position of the disc 151. The hydraulic rams 153 and 154 have pistons linked to a crank arm 160. Each ram has a valve 157 which allows, when open, flow of oil between each side of the piston. This allows free rotation of the disc 151 and hence of the blade 152, thereby allowing the blade to streamline with the water. This disengaged mode can be used for maintenance or for minimisation of possible destructive forces during storms. Also, each ram have within its oil a small air bubble thereby providing a soft locking effect when the valves 157 are closed.

It will be appreciated that any other suitable lock may be used to set the desired angular position of a blade with respect to its frame. For example, there may be insertion of lock bolts into holes in a disc.

The sensor to detect angular position may be of any one or more types, including optical or indeed mechanical such as with a spring-loaded catch.

It will be appreciated that the invention provides a WEC with a simple construction for efficient energy transfer from waves to a prime mover for useful output. The structure may be mounted in any suitable manner such as being a floating body which is moored or it may be fixed to the sea bed or shore or to a body such as an oil rig-like structure. The pivoting frame may be mounted to have the desired level of buoyancy so that it operates near the surface to have optimum exposure to wave power, and due to its simple construction is reliable and simple to maintain. The level of power can be set by choice of size and number of blades. Advantageously, because the blades may be separated by a half wave length and be on opposite sides of a pivot joint, there is for most points in time constructive applied forces which are complementary to achieve the reciprocating rotary motion.

Tests on such a device have been carried out at 1:50 scale in a tank on a model having a configuration of the WEC of FIG. 9(b). The blades were hollow and buoyant enough to support the whole device and PTO with just a little of the upper parts of the fins showing above mean water level (i.e. tank waves turned off). The distance between blade supports was 1.2 m, width of blades 0.8 m and distance from edge to edge was 0.4 m. The blade angles were 45° from horizontal. The waves used were of a pattern designed to simulate typical Atlantic waves of the West coast of Ireland (i.e. Bretschneider Spectrum). The results demonstrated a broad bandwidth of energy capture, with a typical output for the small (1:50) prototype of 0.3 to 0.5 Watts being measured. Friction is a major energy loss with a mechanical PTO at such a small scale so very considerable increases in power can be anticipated as bigger models decrease the proportion of energy lost to friction. As scaling power factor is 900 000 times for 1:50 therefore power of 0.8 MW and averaging over a year of 2.5 GWh.

Referring to the FIG. 16 a WEC 200 of another embodiment has a long line 201 having a length of greater than 100 m supporting a series of blades 202. The support 201 and the blades 202 are together buoyant, preferably with the blades being at least partly hollow. The blades 202 are free to rotate in the clockwise direction only up to a limit set by chords 203. Thus, in each half-cycle there is no applied force as the blades streamline with the water direction, whereas in the other half cycle they apply forward force to pull a barge or boat B. A pilot craft 210 is linked to the line 201 at the leading end to retain the line 201 in position approximately perpendicular to the waves, into or against the wave direction. When the blades are "up" and not pulling, then the small pilot craft maintains tension. In this embodiment the following are preferred dimensions:

blade depth 0.7 m to 1.4 m preferably about 1.2 m,
blade width 10 m to 60 m, preferably about 40 m,
overall length, for example about 100 m 200 m,
number of blades about 120 to 140.

FIG. 17 is a plan view illustrating an alternative arrangement, in which blades 301 pivot about vertical axes on a line 302.

The following are preferred dimensions:
blade depth 0.6 to 1.4 m, preferably about 1.2 m,
blade width 0.6 to 1.4 m, preferably about 1.2 m,
overall length preferably about 100 m to 200 m.

Referring to FIGS. 18(a) and 18(b) a boat B employs a stabilization apparatus 400 with a fore blade 401 and an aft blade 402. These are arranged in the opposite sense to those of FIG. 1, so that tilting/rotation is reduced rather than enhanced. As shown in FIG. 18(a), as a crest approaches the bow of the boat B is pushed down and the stern is pushed up, and vice-versa as a trough approaches as shown in FIG. 18(b). The system 400 significantly reduces the rolling between fore and aft of the moored boat. It would be suitable for many types of moored vessel, such as ships, cranes or other equipment on pontoons, large "floating hotels" servicing oil rigs, etc. This stabilization apparatus applies to static vessels, not vessels in motion. Again, the blade separation is n the range of about half a wavelength, preferably 30 m to 100 m, and preferably 50 m to 80 m.

The invention is not limited to the embodiments described but may be varied in construction and detail.

The invention claimed is:

1. A power transfer mechanism for converting reciprocating rotary input power of wave energy converter parts to unidirectional rotary output power, the power transfer mechanism comprising
a plurality of sprockets or pulleys, the plurality of sprockets or pulleys being connected by sprag clutches to shafts, and said shafts being linked to an output prime mover,
wherein the sprag clutches are arranged so that power is transferred from the sprockets or pulleys to the shafts so that the shafts contribute to driving the prime mover, or are idle, irrespective of direction of rotation of the sprockets or pulleys; and
wherein a set of a plurality of the sprockets or pulleys are driven by a chain or a belt; and
wherein the sprockets or pulleys of the set are rotated by the chain or the belt in a same direction; and
wherein the shafts are interconnected by gears, which are in turn linked to the output prime mover; and
wherein the sprag clutches are arranged so that all of the gears are either driven in a same sense or are idle at any time; and
wherein the power transfer mechanism further includes a generator linked with the output, a sensor to detect mutual rotation of the wave energy converter parts, and a generator controller to disable the generator as mechanical input power is near zero in each input power cycle.

2. A wave energy converter convertor comprising:
an elongate support having a length of at least 100 m, and with a leading end and a trailing end;
a plurality of blades mounted on the elongate support along its length, wherein the elongate support and the blades are together buoyant;
blade restraints arranged to allow blade rotation in one direction with streamlining but rotation in an opposite direction up to a limit at which a wave imparts energy to move a vessel attached to an end of the elongate support.

3. The A wave energy converter as claimed in claim 2, wherein the blades rotate about a horizontal axis or about a vertical axis.

4. The wave energy converter as claimed in claim 2, wherein the blades are at least partly hollow.

5. The wave energy converter as claimed in claim 2, wherein the blade restraints include chords extending from the elongate support to the blades.

6. The wave energy converter as claimed in claim 2, wherein the blades are mounted to pivot about horizontal axes.

7. The wave energy converter as claimed in claim 2, wherein the blades are mounted to pivot about horizontal axes, and a blade depth is in the range of 0.7 m to 1.4 m.

8. The wave energy converter as claimed in claim 2, wherein the blades are mounted to pivot about horizontal axes, and a blade width is in a range of 10 m to 60 m.

9. The wave energy converter as claimed in claim 2, wherein the blades are mounted to pivot about vertical axes.

10. The wave energy converter as claimed in claim 2, wherein the blades are mounted to pivot about vertical axes and the blades have a depth in the range of 0.6 m to 1.4 m.

11. The wave energy converter as claimed in claim 2, wherein the blades are mounted to pivot about vertical axes and the blades have a width in the range of 0.6 m to 1.4 m.

* * * * *